United States Patent Office 3,421,876
Patented Jan. 14, 1969

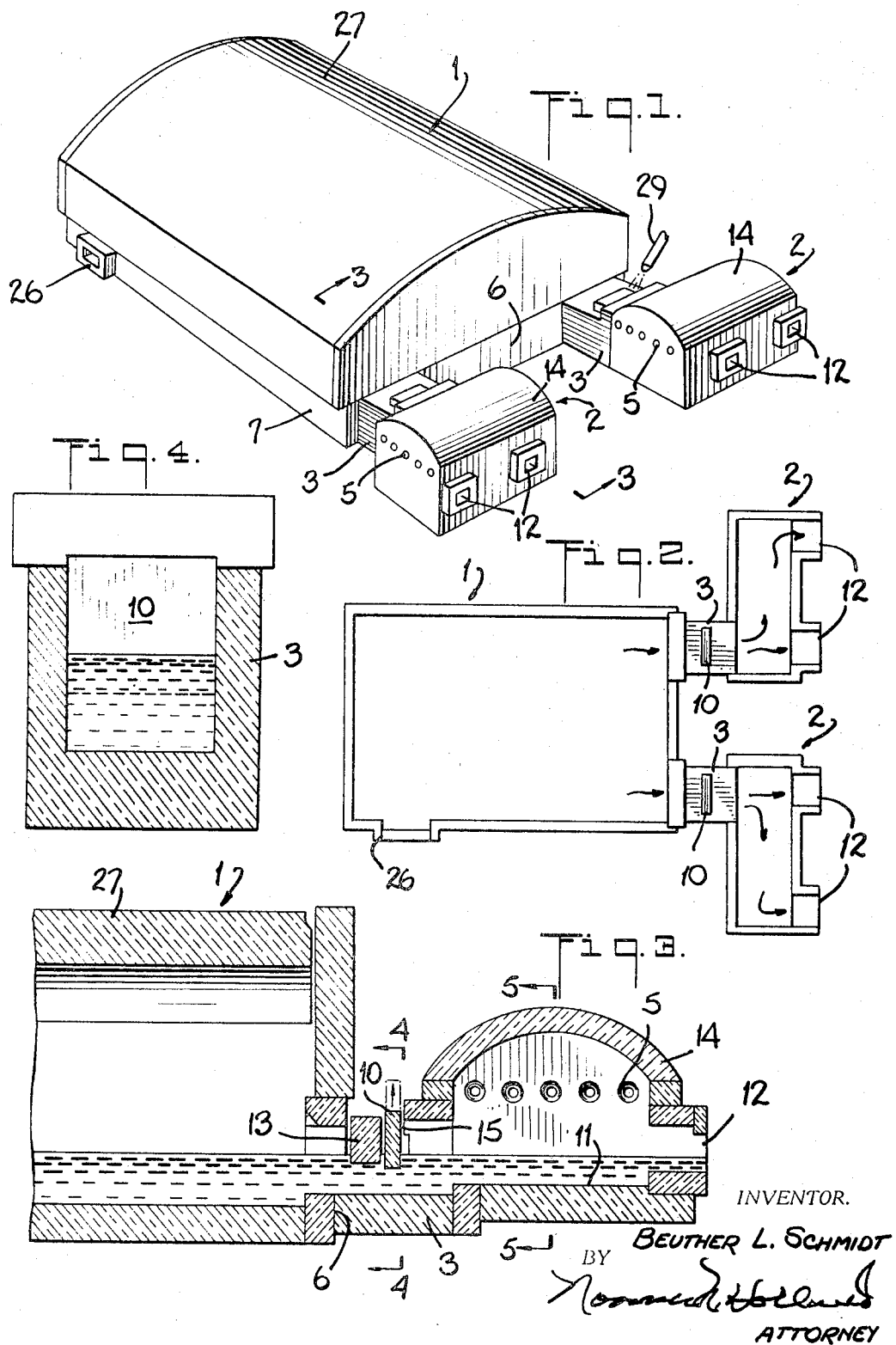

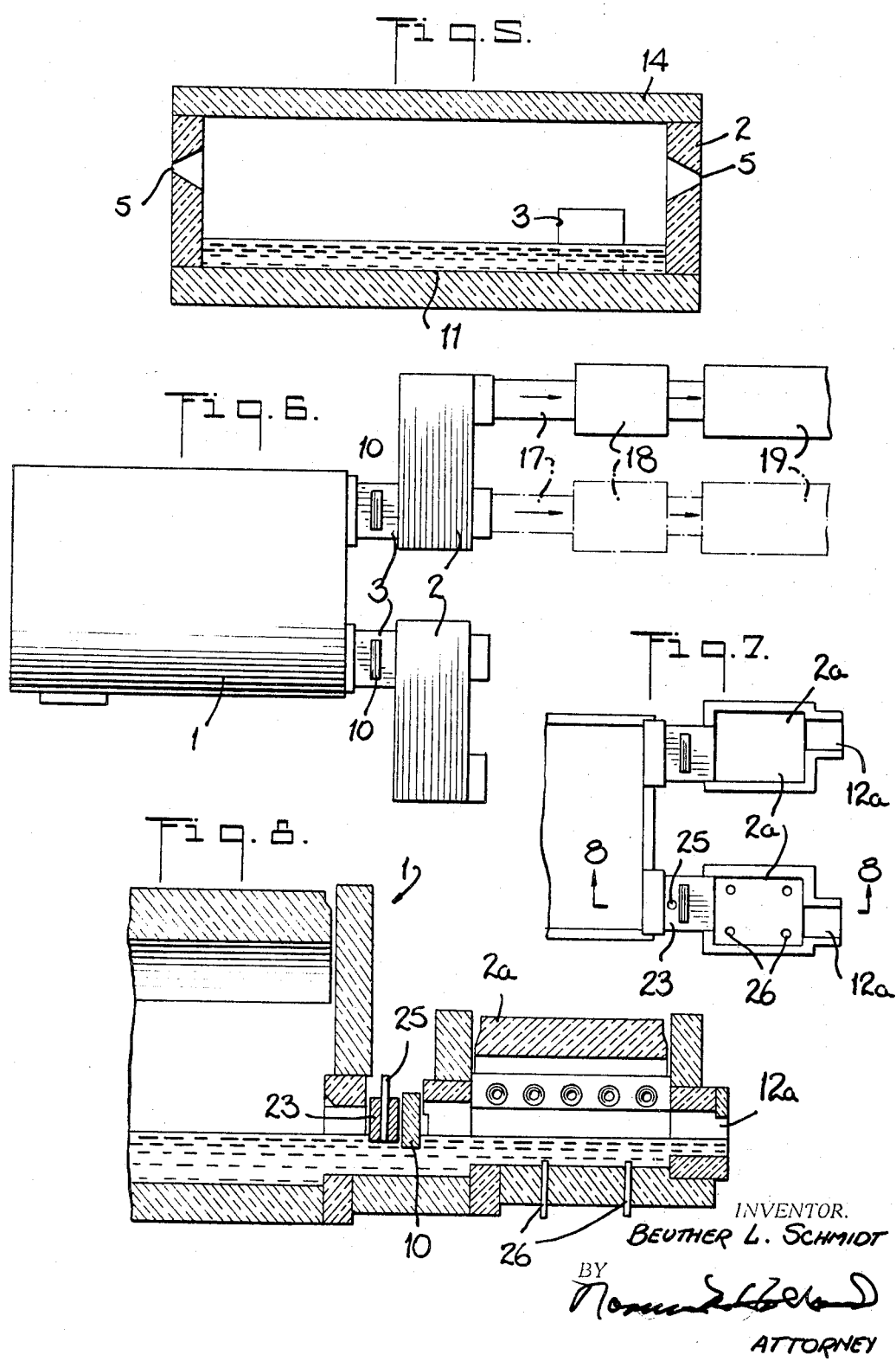

3,421,876
GLASS FURNACE WITH TWO SEPARATE THROAT PASSAGES
Beuther L. Schmidt, Fairfield County, Ohio, assignor to Anchor Hocking Glass Corporation, Lancaster, Ohio, a corporation of Delaware
Filed Nov. 4, 1965, Ser. No. 506,384
U.S. Cl. 65—346   5 Claims
Int. Cl. C03b 5/16

ABSTRACT OF THE DISCLOSURE

An improved glass furnace having two or more separate flow passages or throats in the front wall of the melting chamber each connecting with its own refining chamber. The passageways are positioned along the front wall and particularly at the corners to permit free flow of the glass from the melting chamber to avoid stagnant areas therein and are appropriately spaced to permit easy access to all the walls for making repairs. Adjustable skimming means are provided in the passageways and colorants may be added at one or all of the passages to produce different colored glasses from the same batch.

---

The present invention relates to glass furnaces and more particularly to improvements in glass furnaces of the type which have a plurality of refining chambers each connected by a throat or passageway to the melting chamber.

The design of regenerative fired glass furnaces, either end port or side port, has changed little since their inception. Improveemnts have been made in their construction, in the refractories, and in the operation but fundamentally the furnace has been the same for many years.

The usual commercial furnace includes a melting chamber which is designed to operate at temperatures around 2750° F. for flint glass and has regenerators for recovering some of the heat from the exhaust gases leaving the melting area. The glass batch is fed through one end of the melting chamber and after melting flows through a throat or passageway at the opposite end of the melting chamber into the refining chamber. The throat is located in the center of the wall between the melting chamber and the refining chamber. The melted glass in the refining chamber is lowered slightly in temperature and physically homogenized. From the refiner the glass is conducted through forehearths or channels extending radially from the rounded front of the refining chamber and is further cooled to working range and passed over a submerged orifice in the floor of each of several forehearths. Feeders deliver charges of glass from the forehearths to forming machines.

Such furnaces contain many tons of molten glass, and are difficult to repair. The refractory material on the inside of the furnace erodes and particles fall into the glass which impair its quality.

The throat or channel leading from the melting chamber to the refining chamber is vulnerable to erosion because all the glass must pass through the throat causing excessive wear particularly at high throat temperatures. Repairs to the throat in present commercial furnaces are difficult not only because the throat is submerged in molten glass but also because of its inaccessible location between the melting chamber and the refining chamber. The glass in the usual commercial melting chambers does not flow at uniform rates through the chamber in all areas but has stagnant areas which consume fuel and reduce the effective melting capacity of the furnace.

The present invention aims to provide a glass furnace which is less expensive to build, has a longer life with a minimum of repair. In addition the present invention greatly facilitates repairs of the throat, is substantially shorter in length, permits a better layout of the machinery which it serves, and reduces the space and the cost of the building required. The invention also aims to increase furnace efficiency by reducing the amount of fuel required for each ton of molten glass produced. In addition the present invention enables the furnace to deliver different colors of glass from the same batch material by means of suitable color additives.

An object of the invention is to provide a more efficient furnace for melting glass and thereby reduce the cost of fuel for each ton of glass delivered.

Another object of the invention is to reduce the cost of maintenance and to increase the life of the glass furnace and thereby obtain greater production before the wear on the refractory requires that the furnace be rebuilt.

Another object of the invention is to reduce the wear on the throat or passageway leading from the melting chamber.

Another object of the invention is to provide a throat which is accessible for repair and for cooling to minimize wear.

Another object of the invention is to reduce the length of the furnace and thereby reduce the length of the building required to house it and the machinery which it serves.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of the improved furnace viewed from the front end;

FIG. 2 is a plan view with the top portion of the furnace removed showing the molten glass in the melting and refining chambers and the course of flow through the furnace;

FIG. 3 is a sectional view through the throat or passageway leading from the melting chamber to the refining chamber taken along line 3—3 of FIG. 1;

FIG. 4 is a sectional view taken along the line 4—4 of FIG. 3;

FIG. 5 is a sectional view taken along the line 5—5 of FIG. 3;

FIG. 6 is a block diagram illustrating diagrammatically the improved furnace together with a preferred layout of the machinery which it serves;

FIG. 7 is a top plan view of a modification of the preferred embodiment utilizing smaller refining chambers; and FIG. 8 is a sectional view taken along the line 8—8 of FIG. 7 illustrating the delivery of concentrated coloring material to the glass as it enters the refining chamber.

Referring again to the drawings illustrating a preferred embodiment of the invention and more particularly to FIGS. 1 and 2 there is shown a melting chamber 1 with a pair of refining chambers 2 connected to the melting chamber by throats or passageways 3.

The melting chamber as shown in FIGS. 1 and 2 comprises a reservoir for molten glass preferably substantially rectangular in shape with the two sides and ends confining the glass. The batch materials comprising mainly soda, lime and sand with minor amounts of other materials are automatically mixed and delivered in a stream through the dog house 26 at the back end of the melting chamber which is regulated to keep a proper level of melted glass. The melting chamber contains many tons of glass and the newly added batch material melts as it flows along on the molten glass surface. The melting chamber further comprises a roof 27 which encloses and retains the heating gases. The heating gases enter and leave ports (not shown) at the end of the melting chamber. The air for combustion passes through the usual checker brick which has been preheated by hot exhaust gases in the preceding cycle. After combustion the heated gases pass over the top of the glass to apply necessary heat and exhaust through the ports of the melting chamber. Before exhausting to the atmosphere the hot exhaust gases yield heat to another bank of regenerative checker brick. The flow of combustion air and exhaust gases is reversed periodically to obtain maximum efficiency from the banks of checker bricks. It will be understood that the above heating system is typical and that any other suitable form of heating may be used. For example, electric currents may be utilized for heating and frequently are where hydro-electric power is available to reduce the cost of current. Likewise combinations of gas and electric heating may be utilized. The present invention is not concerned with the type of heating as it is equally applicable to any of the several types and to any of the several fuels such as gas or oil.

The walls of the melting chamber and also of the throats and refining chambers are made of refractory material which will sustain the high temperatures of the molten glass and the fuel gases.

The glass at the front end of the melting chamber in the preferred embodiment is completely melted and passes to the refining chambers through a pair of throats 3 one of which is shown in detail in FIGS. 3 and 4. The throat may be of any suitable shape but is here shown rectangular in cross section with top, bottom and sides made of refractory material. A skimmer 10, which is preferably a block of refractory material, is fitted to slide in an opening 15 in the upper side of the throat. The skimmer 10 is preferably adjustable so that it may be raised or lowered depending upon the type of glass being melted. The adjustment may be made by manually raising or lowering the skimmer block with a suitable tool to control the rate of flow. If desired a suitable yoke may be provided with a threaded rod secured to the block for raising and lowering the skimmer. The skimmer block 10 is mounted in the upper side of the throat and is adjacent a fixed but replaceable block 13 which is shown abutting the end of the melting chamber at the throat and extending down below the level of the molten glass in the throat as shown more particularly in FIG. 3. The replaceable block 13 wears more rapidly than other parts of the furnace. In present commercial furnaces there is not sufficient room to permit replacing of the block which complicates and increases the cost of repairs and reduces the life of the furnace. In the preferred embodiment the block 13 is readily accessible and can be removed and replaced without excessive cost.

In the preferred embodiment the two throats are located in the front wall 6 of the melting chamber 1 adjacent the side walls 7. The advantages of this construction are first the glass in the melting furnace is drawn toward the corners at the front of the furnace to give a uniform flow throughout the furnace. Where the throat is at the center of the melting chamber which is customary in present commercial practice the glass is drawn toward the center leaving stagnant areas and preventing the full utilization of the entire melting area of the chamber. The location of the throats as disclosed herein will produce 10 to 15% more melted glass with the same amount of fuel, as compared with the customary single throat furnace. In addition the flow of the glass is made effective along the sides of the furnace which prevents accumulation of glass and slow movement of glass near the sides which are cooler areas than the middle of the furnace. This provides greater uniformity in heating and in temperature throughout the melting chamber which improves both the efficiency of the furnace and the quality of the glass.

The amount of glass passing through each throat 3 is reduced substantially and hence the wear and erosion of the inside of the throats is greatly reduced thus giving longer life and better quality of glass. The amount of glass passing through the throats is equalized and regulated by selecting forming machines for each refining chamber which utilize substantially the same amount of glass thus avoiding excessive unbalanced loading of the throats. The throats 3 are fully exposed which permits the outer surfaces to be cooled as for example by directing air or suitable moisture sprays 29 against them. Cooling the refractory does not materially affect the temperatures of the glass passing through the throats but at the same time it keeps the refractory cooler than it otherwise would be. Even if the temperature of the glass is reduced slightly at this point that is not objectionable the glass delivered to the refining chamber should be at a lower temperature than the glass in the melting chamber. Reducing the temperature of the refractory around the throat increases greatly the life of the throat because high temperatures are a major cause of wear and erosion.

The preferred refining chamber 2 is illustrated in FIGS. 1, 2, and 3. The bottom 11 is preferably stepped up above the bottom of the throat so that the depth of the glass in the refiner is less than it is in the throat and considerably less than it is in the melting chamber. The refining chamber is preferably formed by a refractory similar to that in the throat and melting chamber and is preferably rectangular with sufficient length to accommodate two or more outlets 12 which are suitable for mounting forehearths. The glass in the refining chamber may be heated by burners 5 in the ends of the chamber to maintain the desired refining temperature for homogenizing the glass by means of a suitable automatic temperature control coupled to the fuel supply. A cover 14 closes the top of each refining chamber.

Preferably each throat 3 enters the side of the refining chamber near its inner end. The glass in the refining chamber should be kept in a quiescent state so that the bubbles and other impurities may rise to the top, however, there is no difficulty in maintaining an even flow to each of the forehearths. While the throat could be located at the middle of the wall of each refining chamber, it is preferable to allow substantial space between the ends of the two refining chambers so that workmen can go between them for repairs or other purposes without having to be too close to the heated refractory.

The two refining chambers replace the usual large single refining chamber now in general use which is in effect a part of the melting chamber, the two being separated by a dividing wall the upper portion above the glass level being formed with openings to permit entry of the furnace gases into the refining chamber. In the practice now generally used the gases from the melting chamber pass through the open work usually called the shadow wall, into the refining chamber to supply the necessary heat. The amount of heat and the resulting temperature in the refining chamber are controlled by increasing or decreasing the temperature and pressure of the gases delivered to the melting chamber so that more gases pass into the refining chambers. This was and is an undesirable and difficult way to maintain uniform and proper temperatures of the glass in the refining chamber. In addition any increase in temperature of the gases reduces the life of the furnace. Also the gases tend to carry alkali vapors into the refiner causing damage to the refractory. The temperature of the glass in the refiner of the present invention is saparately controlled.

The usual type of single refining chamber described above now in general use has a rounded front substantially in a semicircle with openings for mounting the forehearths extending outwardly from the rounded portion. This requires forming machines, receiving glass from the forehearth feeders, to be arranged in substantially a semicircle about the front of the furnace. The lehrs which anneal the glass generally have their front ends in alignment. Thus the distance from the forming machines to the lehr is greater at the sides of the furnace than at the middle of it. This results in longer conveyors from some forming machines to the lehrs and greater cooling of the glass on the longer lines before it reaches the receiving lehr.

FIG. 6 shows a plant layout utilizing a preferred embodiment of the invention. The melting chamber 1 and the refining chambers 2 are as illustrated and described with respect to FIGS. 1 and 2. The machinery utilized with the furnace is indicated in block lines for convenience. The feeders and forehearths 17 deliver charges of glass to a forming machine 18 from which the ware is conveyed to lehrs 19 for annealing the ware and for inspection at the end of the lehr. It will be noted that the feeders and forehearths are in substantial alignment. Likewise the forming machines and the lehrs are also in alignment. This results in a more efficient layout. In addition the distance from the back of the furnace to the front of the refining chambers is some 12 feet less than with the furnaces of the same capacity now generally used. This reduces the space required for the furnace and the machinery which it serves and hence reduces the cost of the building required to house it.

FIGS. 7 and 8 illustrate the invention embodying refining chambers 2a having a single outlet 12a for a single forehearth. The construction of the refining chambers and the throats leading to them are otherwise the same as described with respect to the preferred embodiment as will be seen in the cross sectional view shown in FIG. 8. This embodiment may be utilized if desired and particularly when smaller refining chambers are needed.

Efforts have been made to add concentrated coloring materials to forehearths to provide a particular color of glass utilizing clear flint glass in the melting and refining chambers. The difficulty of obtaining commercial glass in this manner has been quite troublesome. Stirrers and other means have been added to the forehearths to mix the color with the glass without being able to maintain the quality desired. A feature of the present invention is illustrated in FIG. 8, wherein concentrated color material such as colored glass frit or molten glass of a concentrated color are fed through a tube 25.

The tube 25 preferably extends through the replaceable block 23 and preferably extends down below the upper level of the glass to mix the coloring material into the glass near the skimmer block 10. In the preferred embodiment molten glass of a particularly concentrated color passes down through tube 25 and mixes with the glass flowing through the throat. By mixing the color with the molten glass as it flows through the throat to enter the refining chamber, the color distributes throughout the glass during the time that the glass is in the refining chamber.

The invention also provides a plurality of bubbler openings 26 as for example the four openings 26 shown in FIG. 7 to bubble air or oxygen through the glass to further mix the color and it will be observed that the bubbler openings 26 are located near the corners of the refining chamber to prevent concentration of color at the corners where the flow is at a slower rate. This operation mixes and homogenizes color within the glass giving a uniform color for delivery to the forehearth as indicated above. Further mixing of the color in the glass, if needed, may be done in the forehearth by utilizing stirrers such as are known in the art.

Uniform color is secured and a single furnace is enabled to produce several different colors of molten flint glass by means of suitable color additives. Colored glass such as green, ruby, red have been made by separate furnaces but such furnaces cannnot be used efficiently except when large quantities can be sold in continuous production runs of items from a particular color.

With the present invention one or more feeders may be utilized for a particular color and these feeders may be in continuous production because the number of feeders used can correspond to the volume of glass needed so that the color may be run continuously. If it should be necessary to change a feeder from one color to another, the flow of glass to the refining chamber can be stopped by the skimmer block or by other means and the change would not require shutting down the furnace.

It will be seen that the present invention provides a less expensive glass furnace for a given tonnage of production by utilizing efficiently the entire melting area of the furnace thereby increasing the efficiency of the furnace by 10 to 15% as compared with commercial single throat furnaces. An improved quality of glass is also obtained because of the improved melting and the avoidance of stagnant areas along the sides and corners of the furnace. The utilization of two or more refining chambers extending across the front decreases the length of the furnace which permits a shorter building to be utilized for housing the furnace and its machinery. In addition the forehearths leading from the refining chambers have their ends substantially aligned so that the lines of the machinery which they serve may also be aligned. The more efficient melting reduces the amount of fuel required and results in continuous savings in the cost of fuel required. An improved method of applying color concentrate enables smaller runs of high quality colored glass to be produced efficiently and at a reasonable cost. The application of the concentrated colored glass to the stream of molten glass entering the refining chamber assures uniform mixture of the color simultaneously with the refining and homogenizing of the glass in the refining chamber.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A glass furnace for melting and refining glass comprising the combination of a melting chamber for melting a glass batch, said melting chamber having a pair of side walls and a straight front wall closing the chamber and forming corners with the said side walls, glass refining chambers positioned forwardly of each of said melting chamber corners and having separate rear walls spaced forwardly from the melting chamber front wall, a throat connecting each of said corners of the melting chamber to a corner of one of the refining chambers, each of said throats having separate top, side and bottom walls, each of said throat top walls including a removable block adjacent the said melting chamber front wall for engaging the surface portion of glass flowing through the throat, and an adjustable skimmer block positioned in said throat top walls between said removable blocks and the rear walls of the refining chambers.

2. A glass furnace as claimed in claim 1 in which said refining chambers comprise front walls extending generally parallel to said melting chamber front wall, each of said refining chamber front walls having a plurality of glass outlets each of which is adapted for connection to a glass feeding forehearth, and a plurality of forehearths aligned parallel with one another and each connected to one of said outlets.

3. A glass furnace claimed in claim 1 which further comprises means in said throat top wall for delivering glass coloring material to glass passing through said throat.

4. A glass furnace as claimed in claim 1 which further comprises means in said removable block for delivering coloring material to glass passing through said throat.

5. A glass furnace as claimed in claim 1 in which said refining chambers have a substantially greater length in a direction parallel to said melting chamber front wall than in a direction normal to said front wall, and in which the closest ends of two adjacent refining chambers are spaced sufficiently far apart to permit the passage of a workman between them.

References Cited

UNITED STATES PATENTS

| 1,941,778 | 1/1934 | Amsler | 65—135 |
| 3,183,072 | 5/1965 | Long | 65—355 |
| 3,198,618 | 8/1965 | Penberthy | 65—134 |
| 3,328,150 | 6/1967 | Rough | 65—134 |

DONALL H. SYLVESTER, *Primary Examiner.*

EDWARD R. FREEDMAN, *Assistant Examiner.*

U.S. Cl. X.R.

65—134